United States Patent [19]

Metzner et al.

[11] Patent Number: 4,935,457

[45] Date of Patent: Jun. 19, 1990

[54] FIBERBOARD METHOD AND COMPOSITION

[75] Inventors: Wolfgang Metzner; Eberhard Osterloff; Detlef Seepe, all of Krefeld, Fed. Rep. of Germany

[73] Assignee: Deutsche-Solvay Werke GmbH, Solingen, Fed. Rep. of Germany

[21] Appl. No.: 111,145

[22] Filed: Oct. 22, 1987

Related U.S. Application Data

[63] Continuation of Ser. No. 783,123, Oct. 2, 1985, abandoned.

[30] Foreign Application Priority Data

Oct. 23, 1984 [DE] Fed. Rep. of Germany ....... 3438735

[51] Int. Cl.$^5$ .......................... C07F 5/02; B29C 43/52
[52] U.S. Cl. ....................... 524/14; 252/602; 252/604; 252/607; 264/109; 524/15; 524/47; 524/404; 524/405
[58] Field of Search ............... 264/109, 119, 120, 128, 264/136, 137; 252/602, 604, 607; 524/14, 15, 47, 251, 404, 247, 405, 243; 156/62.2

[56] References Cited

U.S. PATENT DOCUMENTS

| | | | |
|---|---|---|---|
| 2,606,889 | 8/1952 | Ward et al. | 524/405 |
| 3,965,056 | 6/1976 | Stout et al. | 524/14 |
| 4,012,558 | 3/1977 | Wurman | 428/411 |
| 4,028,457 | 6/1977 | Davey | 264/120 |
| 4,305,989 | 12/1981 | Luck et al. | 264/120 |
| 4,311,621 | 1/1982 | Nishizawa et al. | 524/15 |
| 4,461,721 | 7/1984 | Goettsche et al. | 252/607 |

FOREIGN PATENT DOCUMENTS

| | | |
|---|---|---|
| 2140051 | 7/1972 | Fed. Rep. of Germany. |
| 52-28565 | 3/1977 | Japan ................................... 264/136 |

*Primary Examiner*—Jan H. Silbaugh
*Assistant Examiner*—Mary Lynn Fertig
*Attorney, Agent, or Firm*—Foley & Lardner, Schwartz, Jeffery, Schwaab, Mack, Blumenthal & Evans

[57] ABSTRACT

A composition and method for producing a fiberboard. The fiberboard is produced from a mixture of wood-containing material, a binder, a waterproofing agent and a liquid concentrate. The liquid concentrate contains boric acid or a derivative thereof, a water soluble compound which includes an alcohol and a water soluble amine-containing compound, and optionally water. The mixture is intermixed and subsequently pressed at a predetermined compacting pressure and a predetermined temperature.

23 Claims, No Drawings

FIBERBOARD METHOD AND COMPOSITION

This application is a continuation of application Ser. No. 783,123, filed Oct. 2, 1985, now abandoned.

BACKGROUND OF THE INVENTION

The present invention relates to a composition and process for the preparation of particle or fiber boards with improved properties. The particle or fiber boards of the invention, hereinafter sometimes collectively referred to as "fiberboard", are comprised of wood chips, wood particles and/or fibers, a binder, preferably a synthetic resin binder, a waterproofing agent and optionally fillers, additives and/or processing aids. In the process of the invention, the chips are mixed or treated with the binder and the other additive or filler substances, and pressed into boards. A liquid concentrate is added to and mixed with at least one of the materials or starting materials used for the preparation of the particle and/or fiber boards. Preferably the concentrate is added to the organic chemical binder or the glue bath containing the binder. The components are arranged, spread and/or preformed, and subsequently pressed with a specified compacting pressure at a specified temperature range.

Processes for the preparation of particle and fiberboard utilizing binders, for example urea resins, condensation resins and the like (or glue baths prepared from them), wood chips, fillers, additives and/or processing aids and other additions, and their pressing at elevated temperatures, are generally known. See for example German Auslegeschrift No. 18 01 209.

It is further known to add a flame retardant substance to the chips or fibers during the preparation of the fiber boards. Known agents include borates, phosphates, sulfates or boric acid. It has been discovered, however, that these agents often lead to a loss of quality of the wood material boards because the function of the binders is detrimentally affected. This phenomena is discussed in German Auslegeschrift No. 20 59 163, column 3, lines 46–50.

According to German Auslegeschrift No. 20 59 163, it is therefore proposed to add kaolin as the flame retarding mineral substance in the production of particle and fiber board. Finally, it is also known to dissolve boron compounds and similar salts in the glue baths and to process them for the production of particle boards in the so-called glue undermixing process. However, the process does lead to various disadvantages, for example, acid reactions in aqueous solutions. The jelling time of the condensation resins is thereby shortened to the extent that the hopper life of glued chips is excessively reduced, frequently resulting in defective bonding due to the premature hardening of the glue.

It is further known that boron compounds are absolutely incompatible with certain resins, for example, phenol formaldehyde resins, so that the resins flocculate out upon the addition of the boron compounds.

SUMMARY OF THE INVENTION

It is accordingly an object of the invention to provide a fiberboard composition containing a flame retardant.

It is another object of the invention to provide a fiberboard composition, as above, having a high quality despite the presence of a flame retardant.

It is yet another object of the invention to provide a process for producing a fiberboard having the above qualities.

These objects and others are achieved by a fiberboard produced by a process comprising: (1) producing a mixture comprising 100 parts by weight of a particulate material, from about 4 to about 30 parts by weight of a binder, and from about 0.5 to about 5 parts by weight of a liquid concentrate, the liquid concentrate comprising from about 50 to about 80 parts by weight of a compound selected from the group consisting of boric acid, an aqueous solution of a boric acid-forming compound, an alkaline borate, and a mixture thereof, from about 50 to about 20 parts by weight of a water soluble component comprising (1) a mixture of at least one alcohol and at least one amine selected from the group consisting of an aliphatic amine, and a polyamine, (2) an alkoxyamine or an alkanolamine, or (3) a mixture thereof, and from about 0 to about 50 parts by weight water; (2) preforming the mixture; and (3) pressing the mixture into a board using a compaction pressure of from about 12 to about 40 dN/cm$^2$ and a temperature of from about 120° C. to about 230° C.

The objects are also achieved by a process for producing the fiberboard, and by a liquid concentrate used in the process.

DETAILED DESCRIPTION OF THE PREFERRED EMBODIMENTS

The particle or fiberboard of the invention has improved properties, and is comprised of a composition containing wood chips, wood particles and/or fibers, a binder, preferably a synthetic resin binder, a waterproofing agent and optionally fillers, additives and/or processing aids. The above components are mixed or treated and then pressed into boards in a known manner. In keeping with the invention, a liquid concentrate is added and mixed with at least one of the materials or starting materials used for the preparation of the particle and/or fiberboard. Preferably the concentrate is added to the organic chemical binder or the glue bath containing the binder. The concentrate is added in amounts of from about 0.5 to about 5% by weight, preferably from about 1 to about 3% by weight, with respect to the absolute dry weight of the chips and/or fibers, and from about 3 to about 18% by weight, preferably from about 5 to about 10% by weight, with respect to the total weight of the glue bath or the binder. The liquid concentrate comprises from about 50–80 parts by weight, preferably 55–70 parts by weight boric acid, and 50–20 parts by weight, preferably 45–30 parts by weight, of a water soluble compound or a mixture of water soluble compounds. The water soluble compounds contain at least one alcohol, preferably a $C_1$–$C_6$ primary alcohol, most preferably a $C_2$–$C_4$ primary alcohol, at least one water soluble $C_1$–$C_6$, preferably $C_2$–$C_4$ aliphatic amine, polyamine and/or alkoxyamine or alkanolamine, together with from about 0–50 parts by weight, preferably from about 5–25 parts by weight, water. The composition is intermixed in a known manner, is laid out prior to pressing into a board, scattered and/or preformed and subsequently pressed under a compacting pressure of 8–60 dN/cm$^2$, preferably 12–40 dN/cm$^2$, and at a temperature of 120°–230° C., preferably 140°–200° C.

According to the process of the invention, a glue bath or a binder ready for application and containing an organic chemical (natural) or synthetic resin adhesive is used, the binder or bath having an adhesive content of 35–65% by weight, preferably 45–55% by weight (calculated as the solids content of the glue bath) and being added to the wood chips and/or fibers in an amount of 4–30 parts by weight, preferably 6–20 parts by weight (calculated as the solid resin with respect to 100 parts by weight of chips and/or fibers).

The liquid concentrate used to improve the properties of chip or fiberboard is known with a similar composition as a wood protection and flame retardant agent, in particular for coatings, from German Patent No. 21 40 051. Following the painting or spraying of the concentrate onto wood, in particular stem wood or cut wood, or other objects to be protected, a lacquer like coating is formed which upon exposure to flames swells up and forms a flame inhibiting porous boric acid anhydride-carbon layer.

However, a liquid concentrate of boric acid and a water soluble amine or polyamine alone is not sufficient according to the invention to obtain the improvement of the properties desired. Rather, at least one organically bonded hydroxyl group (for example an aminoalcohol) or a liquid alcohol must be present. It has been discovered surprisingly in the course of the present invention that the use of an appropriate concentrate in the weight proportion claimed, in particular as an additive to certain glue baths or binders, leads to an improvement of the properties of particle or fiberboard.

As the water soluble compound or mixture of water soluble compounds, mixtures of aliphatic, tertiary, secondary and/or primary alcohols, such as tert.-butanol, isopropanol and the like, but preferably primary alcohols, preferably methanol, ethanol, n-propanol, n-butanol, glycerin and/or glycol and aliphatic amines, preferably propylamine, 1,2-propylenediamine and/or solutions of ethyl amine and the like, are appropriate. The mixture of compounds should have a molar ratio of alcohol groups to amine groups of from about 4:1 to about 1:4, preferably from about 1.5:1 to about 1:1.5.

Preferably, however, according to the present invention, alkanolamines or aminoalcohols having from 2 to 4 carbon atoms are used. The use of monoethanolamine has been found to be especially preferred. The amino alcohols, preferably monoethanolamine, are added, according to a preferred embodiment, in combination with boric acid or a compound forming boric acid in aqueous solutions and/or alkaline borates, preferably orthoboric acid and/or aliphatic alcohol or alcohols and/or an aliphatic amine or amines.

According to a preferred embodiment, the liquid concentrate is added to at least one component of the materials or starting materials used for the preparation of particle and/or fiberboards, preferably to the organic chemical binders or the glue bath containing the binder, in an amount from about 1% to about 3% by weight with respect to the absolute dry weight of the chips and/or fibers used, preferably from about 5% to about 10% by weight of the total weight of the glue bath or the ready-to-be-applied binder.

The binder contained in the glue bath is a formaldehyde resin adhesive or a synthetic resin binder containing formaldehyde as a component. Preferably the binder is a urea-formaldehyde resin, melamine-urea-formaldehyde resin, melamine-phenol-urea-formaldehyde resin and/or a mixture of one or several of the aforementioned resins with isocyanate, alone or in combination with tannin resins.

The particle or fiberboard produced according to the process of the invention have improved properties, for example, better mechanical properties. In particular, a reduction in swelling in thickness, increased transverse tensile strenght and/or an increase in bending strength are obtained, depending on the type and quantity of the synthetic resin binder used in the glue bath. A further advantage of the process according to the invention consists of the fact that the release of formaldehyde by the particle or fiberboard is reduced.

According to a further embodiment, the glue bath and/or the ready-to-be-applied binder contains, depending on the type and quantity of the binder, from about 1–6% by weight, preferably from about 2–5% by weight (with respect to the solids or solid resin content of the binder) of at least one hardener. Known hardening agents, for example, a solution of ammonium chloride, formic acid or other acids or salt solutions acting in a similar manner, for example, ammonium salt solutions, are used.

Pressing times vary as a function of the binder used and the temperature applied, and can be from about 0.08–2 min/mm of board thickness, but are preferably from about 0.12–0.50 min/mm of board thickness.

According to one embodiment, at least one waterproofing agent is added to the mixture for the preparation of the particle boards. The waterproofing agent is preferably based on a paraffin emulsion or hot wax, and is added in amounts of from about 0.1–2% by weight, preferably from about 0.3–1% by weight with respect to the wood chips and/or fibers.

As starting materials for the particle or fiber boards, known raw materials, such as wood chips or fibers, in particular wood chips of deciduous or coniferous trees, are mixed, optionally, in the usual fractions or chip sizes, with pulp wood or wastes, together with additions of saw dust and paper, chips and/or cellulose-containing fibers of annual plants (rice shells, straw, flax, reeds, bagasse, corn stalks, or the like), granulated biomasses (needles, leaves, stalks, bark and the like) and recycled synthetic and natural rubber, waste fibers and other organic substances, including the grinding dust of the boards produced.

According to one embodiment, at least one extender, in particular, wood flour, coconut shell flour, walnut shell flour, bark flour and/or starch in an amount of from about 0.1–3% by weight, preferably from about 0.5–2% by weight, (with respect to the liquid glue (glue bath)) is added, preferably to the glue.

The preparation of the boards according to the invention may be effected preferably with subsequent compression, pressing in single platen presses, multiple platen presses, continuous presses, special presses for molded particle board parts, or calendar installations, optionally with the simultaneous coating of the boards or moldings in a single step, using veneers, resin impregnated paper, foil, metals and textiles, and the like.

The invention further concerns the use of a liquid concentrate consisting of from about 50 to about 80 weight parts, preferably from about 55 to about 70 weight parts boric acid and/or an aqueous, boric acid-forming compound and/or an alkaline boarate, preferably orthoboric acid, and from about 50 to about 20 weight parts, preferably from about 45 to about 30 weight parts, of a water soluble compound or a mixture of water soluble compounds, containing at least one alcohol, preferably a primary alcohol having from 1 to 6 carbon atoms, preferably 2 to 4 carbon atoms, and at least one water soluble aliphatic amine or polyamine and/or an alkoxyamine or alkano-lamine having from 1 to 6 carbon atoms, preferably 2 to 4 carbon atoms, together with from about 0 to 50 parts by weight, preferably from about 5 to 25 weight parts, water as an additive to the organic chemical binders or the glue float containing the binder for the preparation of particle or fiberboards.

As the binder contained in the glue float according to the invention, a formaldehyde resin adhesive or a synthetic resin binder containing formaldehyde as a component, preferably a ureaformaldehyde resin, a melamine-urea-formaldehyde resin, a melamine-phenol-urea-formaldehyde resin and/or a mixture of one or several of the aforementioned resins with isocyanate alone or in combination with tannin resins, may be used.

The following examples illustrate the invention.

EXAMPLE 1

A liquid concentrate was prepared having the following composition:

| boric acid | 60% by weight |
|---|---|
| ethanolamine | 25% by weight |
| water | 15% by weight |

Board compositions were prepared with and without liquid concentrate as follows:

| | Example of a particle board prepared by the process of the invention without the above liquid concentrate | | Board prepared with the above liquid concentrate | |
|---|---|---|---|---|
| Chips | 5245.0 g | 82.66 wt % | 5245.0 g | 82.66 wt % |
| Melamine urea-formaldehyde resin with solids content of 65% by weight | 910.0 g | 14.34 wt % | 910.0 g | 14.34 wt % |
| 60% by weight water proofing agent | 50.4 g | 0.79 wt % | 50.4 g | 0.79 wt % |
| Hardener solution (25% aq. NH4Cl) | 42.3 g | 0.67 wt % | 42.3 g | 0.67 wt % |
| Water | 97.6 g | 1.54 wt % | 47.2 g | 0.75 wt % |
| Liquid concentrate | 0.0 g | — | 50.4 g | 0.79 wt % |

The above-listed components were mixed together homogeneously and pressed into boards according to the invention under the following conditions:

| Temperature | 150° C. |
|---|---|
| Press factor | 0.4 min/mm |
| Pressure | 40.0 dN/cm$^2$ |

| RESULTS | | | |
|---|---|---|---|
| | Example of a particle board made by the process of the invention without the above liquid concentrate | Board made with the above liquid concentrate | DIN/EN Draft Standard |
| Swelling in thickness Q$_{24}$ | 10.5% | 8.3% | 52364 |
| Transverse tensile strength | 1.9 dN/cm$^2$ | 2.3 dN/cm$^2$ | 52365 |
| Bending strength | 192 dN/cm$^2$ | 223 dN/cm$^2$ | 52362 |
| Formaldehyde release | 14.6 mg/100 g | 8.9 mg/100 g | 120 |

EXAMPLE 2

A liquid concentrate was prepared having the following composition:

| boric acid | 60% by weight |
|---|---|
| ethanolamine | 25% by weight |
| methanol | 15% by weight |

Board compositions were prepared with and without liquid concentrate as follows:

| | Example of a particle board made by the process of the invention without the above liquid concentrate | | Board made with the above liquid concentrate | |
|---|---|---|---|---|
| Chips (wood humidity 4 wt %; absolute dry weight 5043 g) | 5245.0 g | 82.66 wt % | 5245.0 g | 82.66 wt % |
| Urea-formaldehyde glue solid resin content: 63.5 wt % | 910.0 g | 14.34 wt % | 910.0 g | 14.34 wt % |
| Water | 97.6 g | 1.54 wt % | 32.1 g | 0.51 wt % |
| Water-proofing agent | 50.4 g | 0.79 wt % | 50.4 g | 0.79 wt % |
| Hardener solution (25% aq. soln.) | 42.3 g | 0.67 wt % | 42.3 g | 0.67 wt % |
| Concentrate | — | — | 65.5 g | 1.03 wt % (or 1.3 wt % with respect to absolute dry chips) |

The above-listed components were mixed together homogeneously and pressed into boards under the following conditions:

| Press temperature | 158° C. |
|---|---|
| Press factor | 0.33 min/mm |
| Pressure | 42 dN/cm$^2$ |

| RESULTS | | | |
|---|---|---|---|
| | Example of a particle board made by the process of the invention without the above liquid concentrate | Board made with the above liquid concentrate | DIN/EN Draft Standard |
| Swelling in thickness 24 h | 15.4% | 13.2% | 52364 |
| Transverse tensile strength | 3.7 dN/cm$^2$ | 3.9 dN/cm$^2$ | 52365 |

| | | | |
|---|---|---|---|
| Bending strength | 168 dN/cm$^2$ | 175 dN/cm$^2$ | 52362 |
| Release of formaldehyde | 12.4 mg/100 g | 8.9 mg/100 g | 120 |

EXAMPLE 3

A liquid concentrate was prepared having the following composition:

| | |
|---|---|
| boric acid | 60% |
| ethanolamine | 25% |
| ethylene glycol | 15% |

Board compositions were prepared with and without liquid concentrate as follows:

| | Example of a particle board made by the process of the invention without the above liquid concentrate | | Board made using the above liquid concentrate | |
|---|---|---|---|---|
| Chips (u = 4%) (wood humidity abs. dry wt. 5043 g) | 5245.0 g | 81.34 wt % | 5245.0 g | 81.34 wt % |
| Melamine-phenol-urea-formaldehyde resin solid resin proportion 63 wt % (corresponding approx. to an addition of 13% to abs. dry chips) | 1040.0 g | 16.13 wt % | 1040.0 g | 16.13 wt % |
| Water | 60.5 g | 0.94 wt % | 10.1 g | 0.16 wt % |
| Hardener solution | 52.0 g | 0.81 wt % | 52.0 g | 0.81 wt % |
| Waterproofing agent | 50.5 g | 0.78 wt % | 50.5 g | 0.78 wt % |
| Concentrate | — | — | 50.4 g | 0.78 wt % (or 1 wt % with respect to abs. dry chips) |

The above-listed components were mixed together homogeneously and pressed into boards under the following conditions.

| | |
|---|---|
| Pressing temperature | 168° C. |
| Press factor | 0.35 min/mm |
| Pressure | 45 dN/cm$^2$ |

RESULTS

| | Example of a particle board made by the process of the invention without the above liquid concentrate | Board made with the above liquid concentrate | DIN/EN Draft Standard |
|---|---|---|---|
| Swelling in thickness after 24 h | 11.3% | 10.2% | 52364 |
| Transverse tensile strength | 1.6 dN/cm$^2$ | 1.9 dN/cm$^2$ | 52365 |
| Bending strength | 190 dN/cm$^2$ | 208.0 dN/cm$^2$ | 52362 |
| Release of formaldehyde | 13.9 mg/100 g | 9.0 mg/100 g | 120 |

EXAMPLE 4

Example of a concentrate

| | |
|---|---|
| boric acid | 60% |
| diethylaminoethanol | 25% |
| water | 15% |

What is claimed is:

1. A formaldehyde resin bonded fiberboard having a reduced tendency to release formaldehyde, produced by a process comprising the steps of:
    (1) producing a mixture comprising:
        100 parts by weight of a particulate material;
        from about 4 to about 30 parts by weight of a glue bath containing from about 35% to about 65% by weight on a dry weight basis of a formaldehyde-containing synthetic resin binder selected from the group consisting of urea-formaldehyde resin, melamine-urea-formaldehyde resin, and mixtures of at least one of the aforementioned resins with isocyanate, alone or in combination with tannin resins; and
        from about 0.5 to about 5 parts by weight of a liquid concentrate, said liquid concentrate comprising:
            from about 50 to about 80 parts by weight of a compound selected from the group consisting of boric acid, an aqueous solution of a boric acid-forming compound, an alkaline borate, and a mixture thereof;
            from about 50 to about 20 parts by weight of a water soluble component comprising (1) a mixture of at least one alcohol and at least one amine selected from the group consisting of an aliphatic amine and a polyamine, (2) an alkoxyamine or an alkanolamine, or (3) a mixture thereof; and
            from about 0 to about 50 parts by weight water;
    (2) preforming a mat from said mixture; and
    (3) pressing said mat into a fiberboard using a compaction pressure of from about 12 to about 40 dN/cm$^2$ and a temperature of from about 140° C. to about 200° C. in a pressing step having a duration of from about 0.08 to about 2 minutes per millimeter of board thickness.

2. A fiberboard according to claim 1, wherein said liquid concentrate is added to said glue bath prior to said mixture-producing step.

3. A fiberboard according to claim 1, wherein said at least one alcohol in said liquid concentrate is a primary alcohol having from 1 to 6 carbon atoms, and wherein said at least one amine contains from 1 to about 6 carbon atoms.

4. A fiberboard according to claim 1, wherein said at least one alcohol is a primary alcohol having from 2 to 4 carbon atoms.

5. A fiberboard according to claim 1, wherein said at least one amine contains from 2 to 4 carbon atoms.

6. A fiberboard according to claim 1, wherein said liquid concentrate contains from about 5 to about 25 parts by weight water.

7. A fiberboard according to claim 1, wherein the amount of binder in said glue bath is from about 45% to about 55% by weight on a dry weight basis of said glue bath.

8. A fiberboard according to claim 1, wherein the amount of the glue bath present in said mixture is from about 6 to about 20 parts by weight per 100 parts by weight of said particulate material in said mixture.

9. A fiberboard according to claim 1, wherein the binder contains from about 1% to about 6% by weight of a hardening agent.

10. A fiberboard according to claim 1, wherein the binder contains from about 2% to about 5% by weight of a hardening agent.

11. A fiberboard according to claim 1, wherein said pressing step has a duration of from about 0.12 to about 0.50 minutes per millimeter of board thickness.

12. A fiberboard according to claim 1, wherein said glue bath includes an extender selected from the group consisting of wood flour, coconut shell flour, walnut shell flour, bark flour, starch and combinations thereof, in an amount of from about 0.1% to about 3% by weight of said glue bath.

13. A fiberboard according to claim 3, wherein the amount of said extender in said glue bath is from about 0.5% to about 2% by weight.

14. A fiberboard according to claim 1, wherein said mixture includes from about 1 to about 3 parts by weight of said liquid concentrate.

15. A fiberboard according to claim 1, wherein said mixture further includes at least one waterproofing agent in an amount of from about 0.1 to about 2.0 parts by weight, said at least one waterproofing agent being selected from the group consisting of a paraffin emulsion, a hot wax, and combinations thereof.

16. A fiberboard according to claim 15, wherein said at least one waterproofing agent is present in said mixture in an amount of from about 0.3 to about 1.0 parts by weight.

17. A process for producing a formaldehyde resin bonded fiberboard having a reduced tendency to release formaldehyde, comprising the steps of:
(1) producing a mixture comprising:
100 parts by weight of a particulate material;
from about 4 to about 30 parts by weight of a glue bath containing from about 35% to about 65% by weight on a dry weight basis of a formaldehyde-containing synthetic resin binder selected from the group consisting of urea-formaldehyde resin, melamine-urea-formaldehyde resin, and mixtures of at least one of the aforementioned resins with isocyanate, alone or in combination with tannin resins; and
from about 0.5 to about 5 parts by weight of a liquid concentrate, said liquid concentrate comprising:
from about 50 to about 80 parts by weight of a compound selected from the group consisting of boric acid, an aqueous solution of a boric acid-forming compound, an alkaline borate, and a mixture thereof;
from about 50 to about 20 parts by weight of a water soluble component comprising (1) a mixture of at least one alcohol and at least one amine selected from the group consisting of an aliphatic amine and a polyamine, (2) an alkoxyamine or an alkanolamine, or (3) a mixture thereof; and
from about 0 to about 50 parts by weight water;
(2) preforming said mixture; and
(3) pressing said mixture into a board using a compaction pressure of from about 12 to about 40 dN/cm$^2$ and a temperature of from about 140° C. to about 200° C. in a pressing step having a duration of from about 0.08 to about 2 minutes per millimeter of board thickness.

18. A process according to claim 17, wherein said mixture further includes at least one waterproofing agent in an amount of from about 0.1 to about 2.0 parts by weight, said at least one waterproofing agent being selected from the group consisting of a paraffin emulsion, a hot wax, and combinations thereof.

19. A process according to claim 18, wherein said at least one waterproofing agent is present in said mixture in an amount of from about 0.3 to about 1.0 parts by weight.

20. A liquid composition for use in producing a fiberboard, comprising:
from about 50 to about 80 parts by weight of a compound selected from the group consisting of boric acid, an aqueous solution of a boric acid-forming compound, an alkaline borate, and a mixture thereof;
from about 50 to about 20 parts by weight of a water soluble component comprising a mixture of at least one alcohol and at least one amine selected from the group consisting of an aliphatic amine and a polyamine; and
from about 0 to about 50 parts by weight water.

21. A liquid composition according to claim 20, further comprising at least one substance selected from the group consisting of alkoxyamines and alkanolamines.

22. A liquid composition according to claim 20, wherein said alcohol and amine mixture comprises a molar ratio of alcohol groups to amine groups of from about 4:1 to about 1:4.

23. A liquid composition according to claim 21, wherein said molar ratio is from about 1.5:1 to about 1:1.5.

* * * * *